United States Patent [19]

Liu

[11] Patent Number: 5,737,938
[45] Date of Patent: Apr. 14, 1998

[54] AIR-CONDITIONING SYSTEM WITH PORTABLE AIR-CONDITIONING UNIT

[75] Inventor: Chunyan Liu, Montville, N.J.

[73] Assignee: ContinOcean Tech Inc., Montville, N.J.

[21] Appl. No.: 789,016

[22] Filed: Jan. 27, 1997

[51] Int. Cl.⁶ ............................................. F25D 3/02
[52] U.S. Cl. ............................................. 62/425; 62/457.2
[58] Field of Search ........................... 62/419, 420, 425, 62/457.2

[56] References Cited

U.S. PATENT DOCUMENTS

| | | | |
|---|---|---|---|
| 3,740,964 | 6/1973 | Herweg | 62/262 |
| 3,802,216 | 4/1974 | Brandimarte | 62/262 |
| 3,961,496 | 6/1976 | Ku | 62/459 |
| 4,612,774 | 9/1986 | Budreau | 62/420 |
| 4,841,742 | 6/1989 | Biby | 62/420 |
| 5,159,819 | 11/1992 | Wong | 62/425 |

*Primary Examiner*—Ronald C. Capossela

[57] ABSTRACT

An air-conditioning system comprising a portable air-conditioning unit (100, FIG. 1) for cooling and dehumidifying a zone and a refrigerating unit (10, FIG. 1) which is separated from the portable air-conditioning unit (100, FIG. 1). The portable air-conditioning unit (100, FIG. 1) comprises a housing (20, FIG. 1), an air-moving device (12, FIG. 1) and one or a plurality of coolant carriers (16, FIG. 1) which can be manually transported between the portable air-conditioning unit (100, FIG. 1) and the refrigerating unit (10, FIG. 1). The coolant carriers (16, FIG. 1) also function as cooling coils of a surface type heat-exchanger for the portable air-conditioning unit (100, FIG. 1). The coolant carriers (16, FIG. 1) are closed and sealed so that the contained coolant can be reused among cooling and refrigerating cycles. The coolant can be water or a solution of water and inorganic salt to make use of the combination of sensible heat, heat of fusion and heat of solution for cooling. The refrigerating unit (10, FIG. 1) is household refrigerator with freezer. The portable air-conditioning unit (100, FIG. 1) is substantially noise-free and the air-conditioning system improves energy efficiency considerably compared with conventional window-air-conditioning units in the prior art.

15 Claims, 6 Drawing Sheets

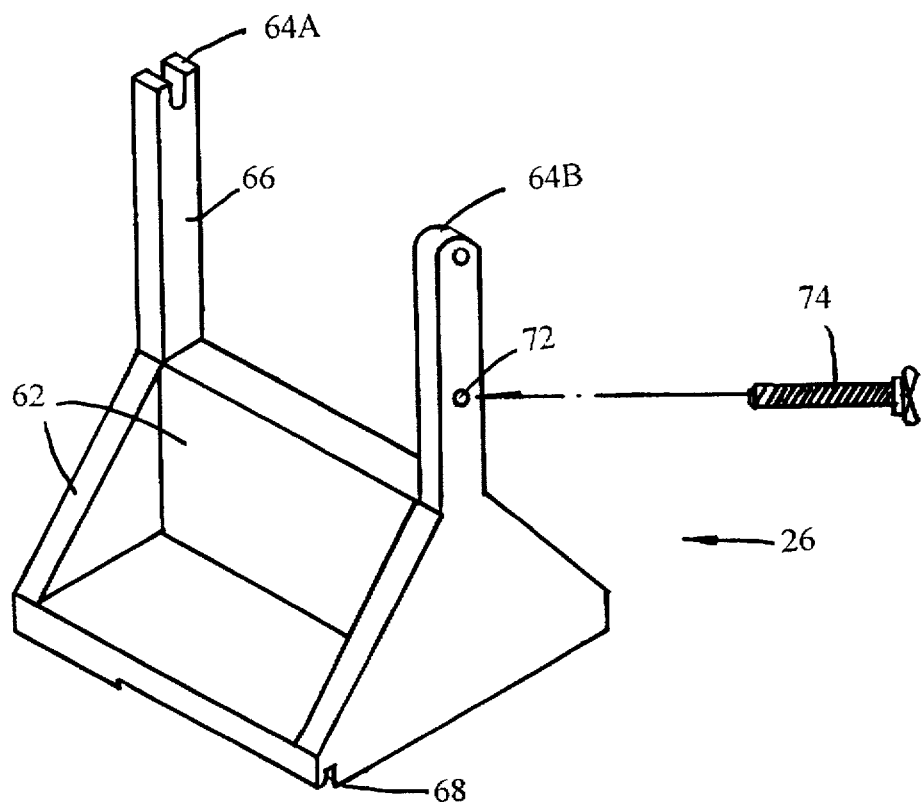
FIG. 7
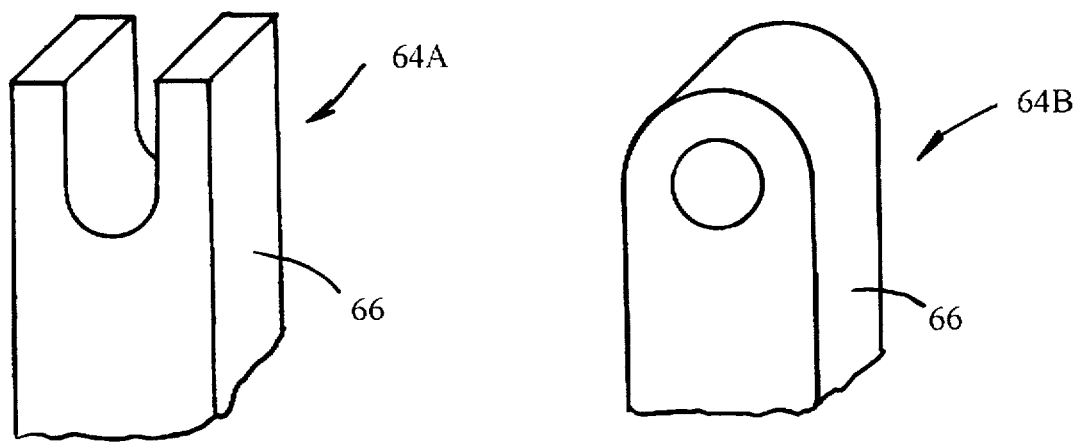
FIG. 7A
FIG. 7B

AIR-CONDITIONING SYSTEM WITH PORTABLE AIR-CONDITIONING UNIT

BACKGROUND OF THE INVENTION

1. Field of the Invention

This invention relates to an air-conditioning system with a portable air-conditioning unit and, more particularly, to an air-conditioning system with a portable air-conditioning unit which uses a phase-change cooling source solidified by a separate refrigerating unit.

2. Background of the Invention

Conventional window-air-conditioning units have disadvantages of being noisy, energy inefficient and inflexible to be moved from one zone to another. For example, the window-air-conditioning units are usually installed in living rooms and can not cool bedrooms adequately, leaving the living rooms, however, unnecessarily over-cooled. In addition, the window-air-conditioning units generate so much noise that people's entertainment and conversation are often unpleasantly interfered. Prior to the present invention, there existed some patents or inventions trying to overcome the disadvantages of the window-air-conditioning units by placing the refrigerating system and cooling unit separately and making the cooling unit 'portable'. There are two modes to couple the separated cooling unit and refrigerating unit. One is using flexible refrigerant conduits, the other is using manual transportation of certain coolant, for example, ice, solidified by other existing refrigerating system, for example, a freezer.

The main problems with the existing portable air-conditioners using the first connection mode mentioned above, are that the air-conditioning systems still contain a set of compressor-condenser unit, which makes the system cumbersome and expensive, and connecting and disconnecting the flexible-refrigerant conduits make the operation complicated. U.S. Pat. No. 3,740,946 disclosed a 'portable air conditioner' system, in which the cooling unit is connected to the condensing unit by flexible fluid hoses. U.S. Pat. No. 3,802,216 disclosed a portable air-conditioner which also couples the cooling units to compressor-condenser units by flexible hoses in a similar fashion but the whole device is encased in a much more compact way and the way of preventing the refrigerant from releasing out of the flexible hoses is different.

A few inventions have used the second kind of coupling modes in their portable air-conditioners by manually transporting ice from other refrigerating systems to their cooling units. They eliminate the problems caused by coping with the compressor-condenser units and the flexible-refrigerant conduits. Theses existing inventions, however, still have the problems of being too complicated to be suitable for daily home, office and travel applications.

U.S. Pat. No. 3,961,496 uses a pump to circulate water between an ice container and an air-water heat exchanger. The heat exchanger and the ice are contained in two separated and insulated upper and lower compartments. Fans are used to assist the air-circulation through the heat exchanger. The upper compartment has to be movable to allow adding ice. The water has to be drained from the lower compartment. The whole unit weighs about 90 lbs when loaded with ice. It is a heavy job to carry the unit to a bathroom or a kitchen where drainage is available. Or a drain pipe has to be supplied between the unit and a drainage system. Care needs to be taken with the initial operating water level to prime the pump. The operation also involves the control of the fans and the pump separately by several thermostats. The system and its operation are complicated and not suitable for general daily home, office and travel applications.

U.S. Pat. No. 4,841,742 disclosed a portable air conditioning unit initially designed for surveillance and also for cars, campers, vans and other similar types of enclosures. The design and operation of the unit are relatively simple. But for general home and office applications, the device can not offer desired thermal comfort in a reasonable time. In addition, adding ice and draining the system are heavy jobs.

OBJECTS AND ADVANTAGES

Accordingly, the objects of the present invention are to overcome the problems in the prior art and to design an air-conditioning system with a portable air-conditioning unit which is suitable for home, office and travel applications and is also easy to operate, substantially noise-free and has low manufacturing cost.

In particular, the present invention is designed to significantly increase the convenience and flexibility of using unit-air-conditioners by completely separating the cooling unit from the refrigerating unit of the conventional unit-air-conditioners. Separated from the refrigerating unit, the cooling unit can be easily moved around and supply the freshly conditioned air efficiently to the place where people need.

Another object is to ease transportation of coolant by using one or a plurality of coolant carriers, such as plastic containers to manually transport the coolant between the refrigerating unit and the portable air-conditioning unit. The coolant carriers are separated from each other and each one of them is small enough to be conveniently carried around. The use of the coolant carriers helps to avoid the problems in the prior art caused by loading ice and draining water.

Another object of the present invention is to provide a means to reuse the coolant among cooling cycles by using the permanently closed and sealed carriers. The coolant can be water undergoing solid-liquid phase transitions among cooling and recharging cycles. The coolant can also be the solution of water and inorganic salt undergoing both solid-liquid phase transition and crystal-solution transitions among cooling and recharging cycles.

Another object of the present invention is to offer a means to save energy by recycling the unmelted or undissolved coolant back to the freezer. The invention avoids wasting energy in the portable air-conditioners in the prior art which have to dump unmelted ice.

Another object of the present invention is to offer flexibility for people to choose the number of coolant carriers to load in the portable air-conditioning unit according to the length of time for the portable air-conditioning unit to function and the temperature of the supplying air that people need.

Another object of the present invention is to simplify design and manufacturing of the portable air-conditioning unit by making use of the coolant carriers to replace cooling coils of a surface type heat-exchanger so that the cooling coils and other auxiliary devices, such as a pump, used in the prior art, are not needed.

The objects of the present invention also include improving energy efficiency by using one refrigerating unit for both air-conditioning and food reservation. Since most of homes and some offices already have refrigerators with freezers, it is not energy efficient to have another refrigerating unit for small-zone and temporary cooling, such as cooling a bedroom or a living room for a few hours. Two refrigerating units also cost more.

In addition, another object of the present invention is to design a portable air-conditioning unit with low manufacturing cost which can be used either as a principle or an auxiliary air-conditioning means.

The air-conditioning system with the portable air-conditioning unit in this invention has the following advantages:

- it provides an air-conditioning unit completely separated from the refrigerating unit for cooling and dehumidifying individual zones conveniently and economically in home, office and travel applications;
- it permits manual transportation of coolant by a series of separated coolant carriers and offers flexibility of choosing to load an appropriate number of coolant carriers in accordance with cooling need;
- it makes use of the coolant carriers functioning together with fan and housing of the portable air-conditioning unit as a surface type heat-exchanger so that there is no need for an extra heat-exchange device;
- it uses closed and sealed containers as coolant carriers so that the coolant is recyclable among cooling and recharging cycles and it saves energy by recycling unmelted or undissolved coolant back to the refrigerating unit;
- it permits use of the solution of inorganic salt and water as the coolant to make use of sensible heat, heat of fusion and heat of solution among cooling and recharging cycles;
- it allows to move the potable air-conditioning unit easily to the place where cooling is needed and avoids cooling the space where cooling is not necessary;
- it makes use of a household refrigerator with a freezer as the refrigerating unit and saves energy for moderate and temporary cooling need;
- it is substantially noise-free.

SUMMARY OF THE INVENTION

In the present invention, the air-conditioning system includes a portable air-conditioning unit for cooling and dehumidifying a zone and a refrigerating unit which is separated from the portable air-conditioning unit. The portable air-conditioning unit comprises a housing, an air-moving device, more particularly, a fan, and one or a plurality of coolant carriers which can be manually transported between the portable air-conditioning unit and the refrigerating unit. The refrigerating unit is a household refrigerator with a freezer. The portable air-conditioning unit is substantially noise-free and the air-conditioning system improves energy efficiency considerably compared with conventional window-air-conditioning units.

The coolant carriers are separated from each other and are small enough to be easily carried around. People can also choose the number of coolant carriers to load in the portable air-conditioning unit according to the length of time and the temperature of cooling that people need. The coolant carriers also function as cooling coils of a surface type heat-exchanger for a portable air-conditioning unit. The coolant carriers are closed and sealed so that the contained coolant can be reused among cooling and recharging cycles. The coolant can be water or the solution of water and inorganic salt to make use of the combination of sensible heat, heat of fusion and heat of solution for cooling.

Inside the housing of the portable air-conditioning unit, the coolant carriers can be placed at the air-outlet side or the air-inlet side of the fan so that the air is blown or sucked through the coolant carriers. If the coolant carriers are placed at the air-outlet side of the fan, an perforated-air-distributor is needed to distribute the air evenly across the coolant carriers.

In home, office and travel applications, the refrigerating unit can be a household refrigerator with a freezer (an ice-maker is not needed). Making use of household freezers as the cold source significantly improves the convenience of using the portable air-conditioning unit. For a moderate and temporary cooling load, consolidation of two refrigerating systems into one improves overall energy efficiency and saves material. Since the freezers are functioning all the time, after the coolant reaches thermal equilibrium with the freezer, storing the coolant in the freezers does not consume a noticeable amount of extra energy for the refrigerating system.

The working principle of the air-conditioning unit is described as follows. The fan forces the warm room air into the housing, creates a pseudo-static pressure chamber before the perforated-air-distributor. The warm air with certain pressure is then evenly pushed out through the perforated-air-distributor and passes through the surface of the coolant carriers and creates forcible convection on the surface of the coolant carriers. Thermal interaction occurs between the solidified coolant and the warm room air through forcible convection and conduction across the thin shell of the coolant carriers. The thermal interaction causes shift of dynamic thermal equilibrium both in the solidified coolant and the moving air. Then the temperature of the solidified coolant increases until it reaches its melting point/range. Solid-to-liquid phase change occurs in the coolant. After completion of the phase change, the temperature of the coolant continues to increase and the crystallized inorganic salt in the coolant carriers starts to be dissolved into the water and absorbs more heat from the air. This process continues until the temperature of the coolant reaches the room-air temperature. The room air, on the other hand, releases heat to the coolant in the coolant carriers and its temperature decreases when passing through the coolant carriers. Cooled air is then blown out to the zone needed to be cooled.

The portable-air-conditioning unit is designed to be easily movable and adjusted so that it can always distribute the freshly-conditioned air right above the zone where people stay. The device in this invention also assures higher energy efficiency by avoiding cooling the space where air-conditioning is unnecessary.

During the course of cooling the air, the portable-air-conditioning unit in the present invention also dehumidifies the air when it passes through the cold surface of the coolant carriers.

A simple control circuitry is designed to turn on the fan in a normal operating mode and shut off the fan when the room average temperature is below a predetermined point or when temperature of most part of the coolant has increased to a point that it has lost cooling ability.

DRAWINGS FIGURES

FIG. 1 a perspective view of the air-conditioning system with the portable air-conditioning unit;

FIG. 7 is a detailed perspective view of the stand of the portable air-conditioning unit;

FIG. 7A and FIG. 7B are detailed perspective views showing the bearings of the stand supporting the portable air-conditioning unit;

Reference Numerals In Drawings

| 100 | air-conditioning system with portable air-conditioning unit | 10 | refrigerating unit |
|---|---|---|---|
| 12 | fan | 14 | perforated air-distributor |
| 16 | coolant carriers | 18 | grooves |
| 20 | housing | 22 | covering board |
| 24 | condensate pan | 26 | stand |
| 28 | coolant | | |
| 32 | air-paths of coolant carriers | 34 | opening of coolant carriers for coolant filling |
| 36 | dents for hand-lifting of coolant carriers | 40 | pseudo-static pressure chamber |
| 42 | shell of housing | 44 | grooves for covering board |
| 46 | handle | 50 | air-intaking port |
| 52 | steel strip for holding fan | 54 | condensate tube |
| 56 | condensate opening | 60 | air-discharging port |
| 62 | reinforcing board | 64A | axial bearing (open-style) |
| 64B | axial bearing | 66 | stand columns |
| 68 | groove for holding condensate pan | 70 | blocks for holding housing at an elevation angle |
| 72 | bolt nut | 74 | bolt for holding housing at an elevation angle |
| 80 | relay | 82 | relay |
| 84 | thermocouple | 86A | thermocouple |
| 86B | thermocouple | 86C | thermocouple |
| 88 | NAND-gate | | |

DESCRIPTION—FIGS. 1 to 8

Figure 1:
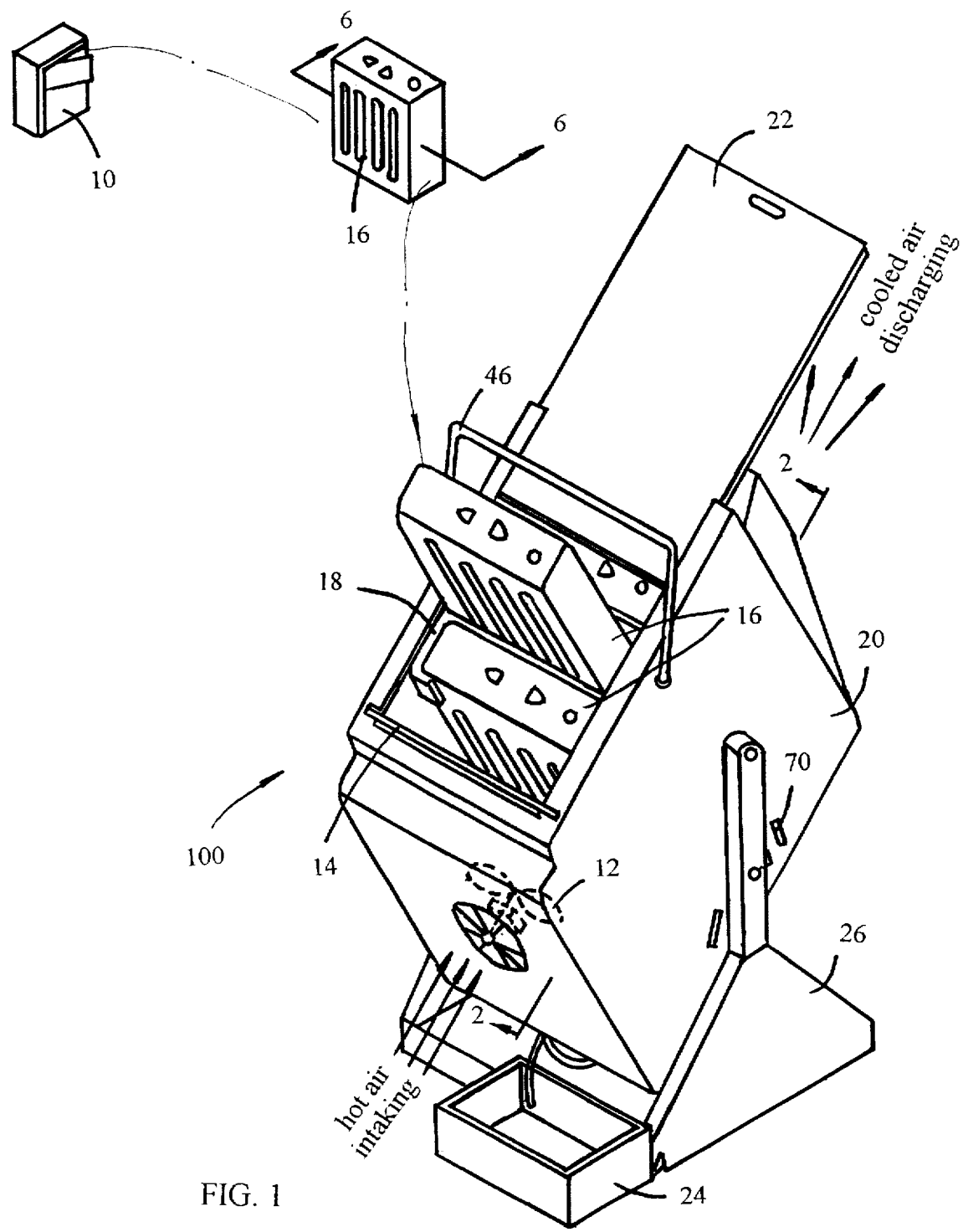
Figure 2:
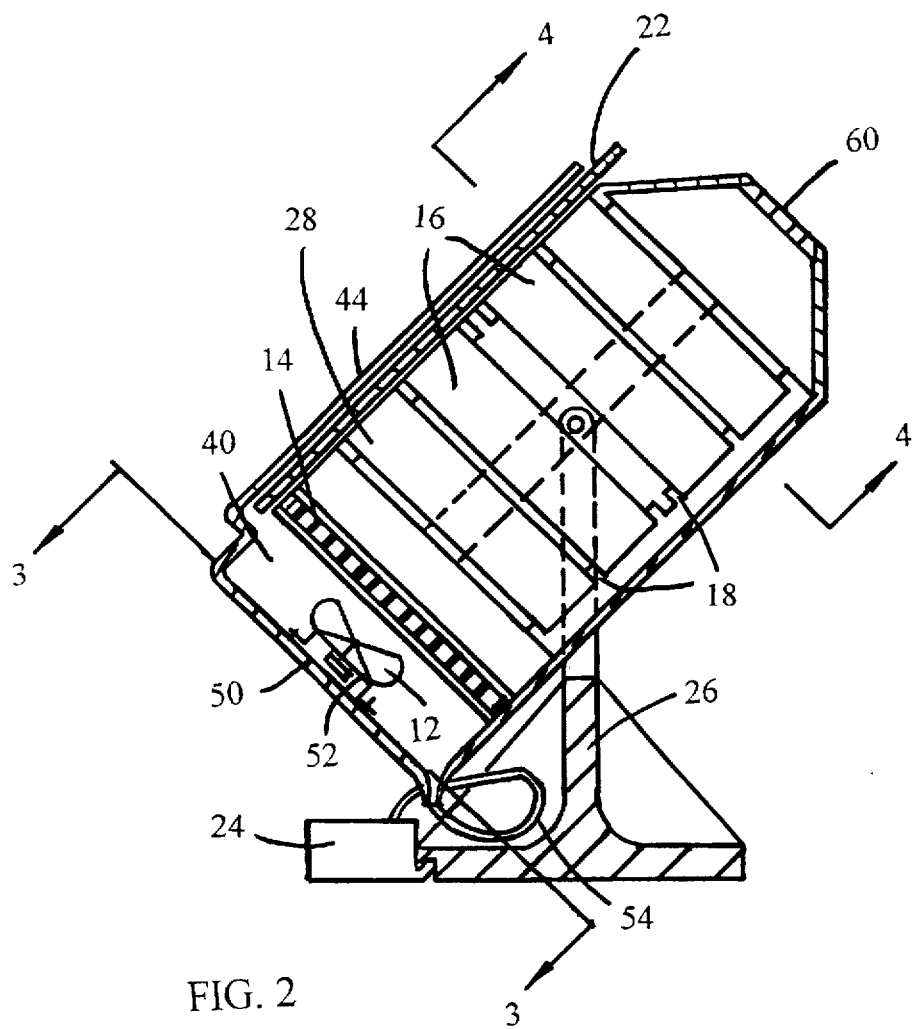
FIG. 2 is an elevation view of the portable air-conditioning unit in section taken on line 2—2 of FIG. 1.

A preferred embodiment of the present invention is shown in FIGS. 1–8, and accordingly designated numerals in this "Description of the Invention" are the same in these ten figures. FIGS. 1 and 2 show that the portable air-conditioning unit 100 in this invention comprises a household freezer 10, a duct-like housing 20, a fan 12 sitting at one entrance of the housing 20 and blowing air into the housing, a perforated air-distributor 14 and one or a plurality of coolant carriers 16 sitting in series at the air-outlet side of the fan 12 in the housing. The air stream passes through the fan 12 first, and then passes through the perforated air-distributor 14 and the coolant carriers 16. A sliding covering board 22 is used to cover the top of the housing during normal operation of the portable air-conditioning unit and to allow taking out and putting in the coolant carriers 16. Coolant 28 filled in coolant carriers is water or a solution of water and inorganic salt. A condensate pan 24 is placed beneath the air-intaking end of the housing 20 to collect water condensed during the operation. A stand 26 for the housing 20 is designed to support the housing pivotably and to allow the longitudinal axis of the housing to be tilted. The body of the housing 20, the covering board 22 and the stand 26 are preferably made of molded plastics.

Figure 4:
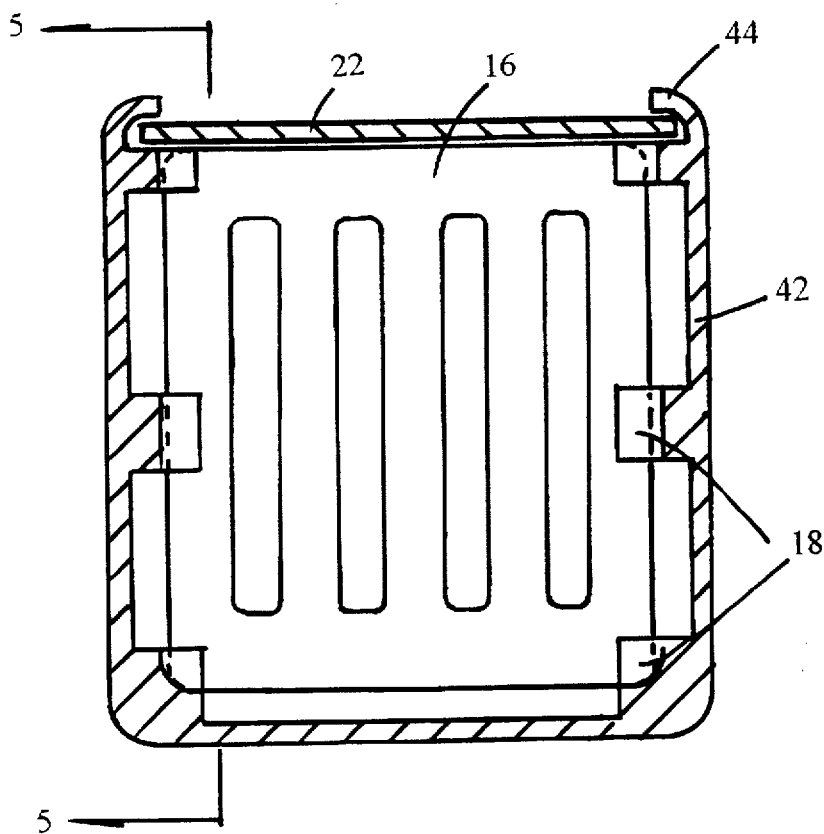
FIG. 4 is an elevation view of the housing body in section taken on line 4—4 of FIG. 2.
Figure 5:
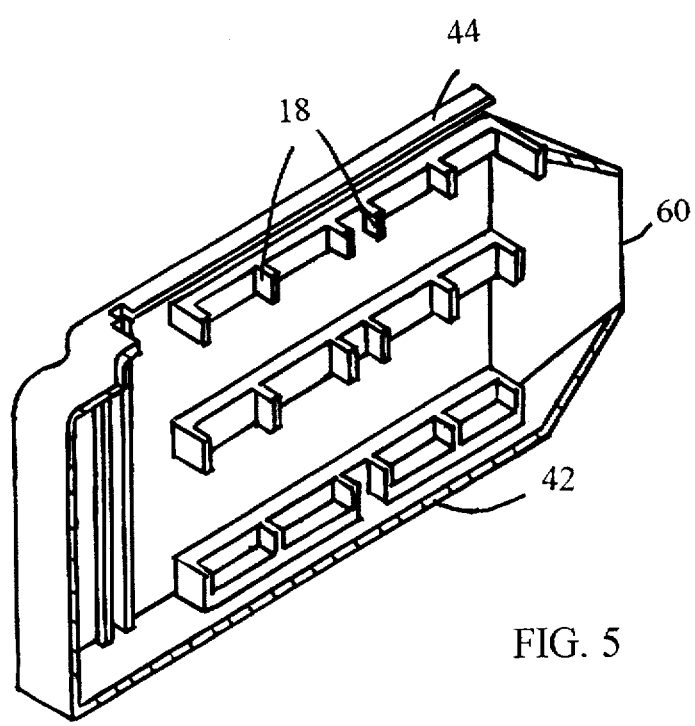
FIG. 5 is a perspective view of the interior of housing body in section taken on line 5—5 of FIG. 4.

Referring to FIGS. 2, 4 and 5, a plurality of ribs molded with the main body of the housing 20 and extruding from the housing shell 42 and toward the interior of the housing 20, form grooves 18 at required locations to retain and support the perforated air distributor 14 and the coolant carriers 16. The perforated air distributor 14 and the coolant carriers 16 can be slid in and out of the housing 20 through specific grooves. Grooves 44 are made at the top of the housing 20 to allow the covering board 22 being slid in-and-out easily.

The housing 20 is preferably insulated to avoid undesirable heat-exchange between said coolant carriers 16 and the surroundings. The insulation also helps preventing undesirable moisture condensation on the outside surface of the housing 20.

Referring to FIG. 1, a handle 46 is preferably attached to the outside of housing body 20 so that the portable air-conditioning unit can be easily moved around.

Again referring to FIG. 2, the fan 12 is of propeller type and is fastened at an air-intaking port 50 by a steel strip 52. The two ends of the steel bar strip 52 are fixed at the rim of the air-intaking port 50. The steel strip 52 crosses the center of the port 50. The warm air is sucked into the housing 20 through the air-intaking port 50 and pushed through the air distributor 14. When the air is pushed through the surface of the coolant carriers 16, heat exchange occurs between the coolant 28 and the air. As a result, the air is cooled by releasing heat to the coolant 28. The cooled air is blown out through an air-discharging port 60 and distributed to the space needed to be cooled.

Referring to FIG. 2, the perforated-air-distributor 14 is held in the grooves 18 and is perpendicular to the longitudinal axis of the housing. The perforated-air-distributor 14 creates a pseudo-static-pressure chamber 40 and helps distribute the air evenly across the coolant carriers 16.

Figure 3:
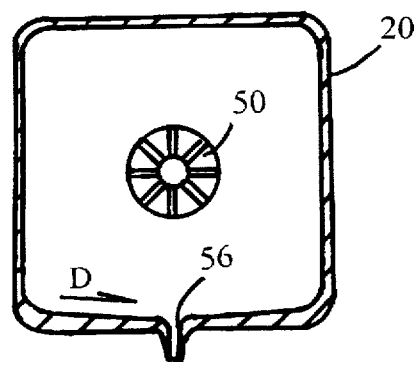
FIG. 3 is an elevation view of the air-intaking end of the housing in section taken on line 3—3 in FIG. 2.

FIGS. 2 and 3 show a preferred structure of air-intaking end of the housing 20. A condensate opening 56 is designed at the center of the bottom edge of the air-intaking end to allow accumulated condensed water to be discharged to the condensate pan 24 through a flexible condensate tube 54. A slope down towards the condensate opening 56 should be maintained to ease the water discharging.

Figure 6:
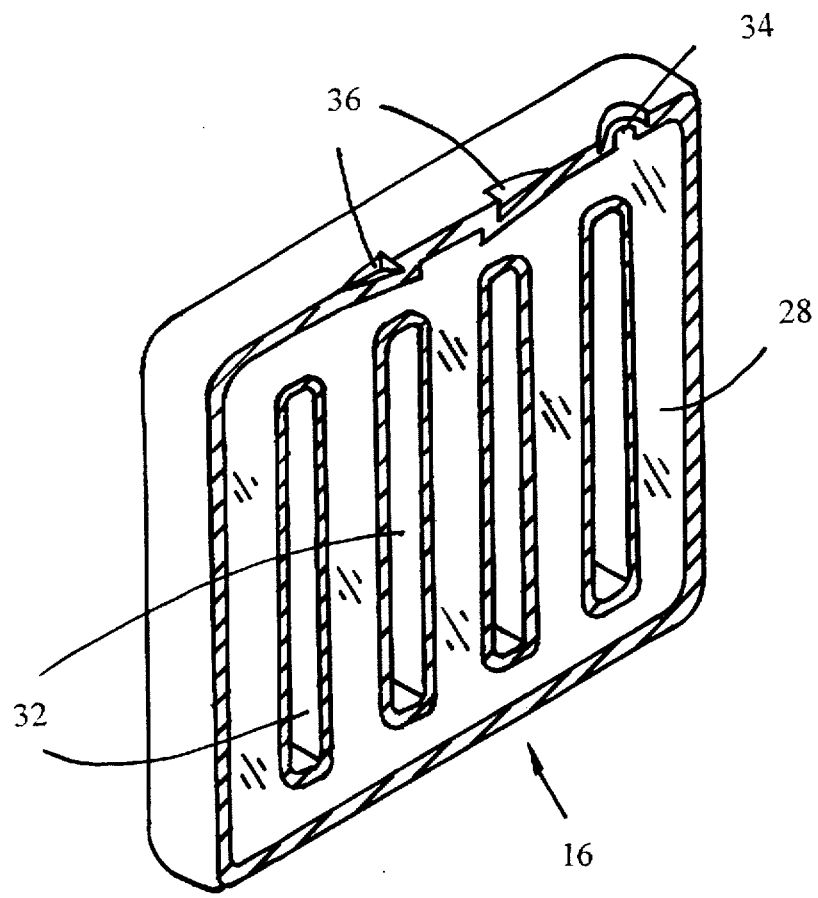
FIG. 6 is an elevation view of the coolant carrier in section taken on line 6—6 of FIG. 1.

Referring to FIG. 6, a series of coolant carriers 16 work together as cooling coils of a surface-type heat-exchanger. Each of these coolant carriers is constructed preferably by vertically-arranged hollow ribs connected to each other by bottom and top horizontal hollow bars. Each coolant carriers 16 is filled with the coolant 28. The coolant 28 can flow freely among the hollow ribs and hollow bars of coolant carriers 16. The out-to-out dimensions of the length and width of the coolant carriers 16 are slightly smaller than the corresponding dimensions of the transversal-cross-section of the housing 20 so that they can be transversely inserted into the housing 20. Extra space is preferably provided between the coolant carriers 16 and the interior surface of the housing 20. Air paths 32 are formed by the space among vertical hollow ribs and the space between the coolant carriers 16 and the interior surface of the housing 20. The air is forced into the housing 20, passes through the perforated-air-distributor 14 and passes through the coolant carriers through these air paths 32. The coolant carriers 16 are preferably made of molded plastics. An opening 34 is molded together with the coolant carriers for filling the coolant 28 and should be sealed permanently after the filling. In addition, a pair of dents 36 are designed for easy hand-lifting of each coolant carriers 16.

The housing 20 is supported by the stand 26 in such a way that the longitudinal axis of the housing 20 can be tiled and easily adjusted and therefore the freshly-conditioned air can be distributed right above the region where cooling is needed. Referring to FIGS. 1, 7, 7A and 7B, the housing 20 is supported by the stand 26 through coupling a pair of stud-axles extruded out symmetrically from each side of the housing body to a pair of axial bearings 64A and 64B. Open style of bearing 64A is designed for easily assembling the housing 20 to the stand 26. The bearings 64A and 64B are supported by columns 66 and reinforcing boards 62. A groove 68 is designed to hold the condensate pan 24 in a way that the condensate pan 24 can be slid in and out of the stand 26 for discharging the condensed water.

Molded together with the housing body, a plurality of small cubic blocks 70, shown in FIG. 1, are extruded from the outer surface of the housing body 20. Shown in FIG. 7, a bolt 74 is fastened by a bolt nut 72 fitted in one of the columns 66 of the stand 26, and is coupled to any one of the cubic blocks 70 to hold the housing 20 such that the longitudinal axis of the housing 20 is held at a required elevation angle.

Figure 8:
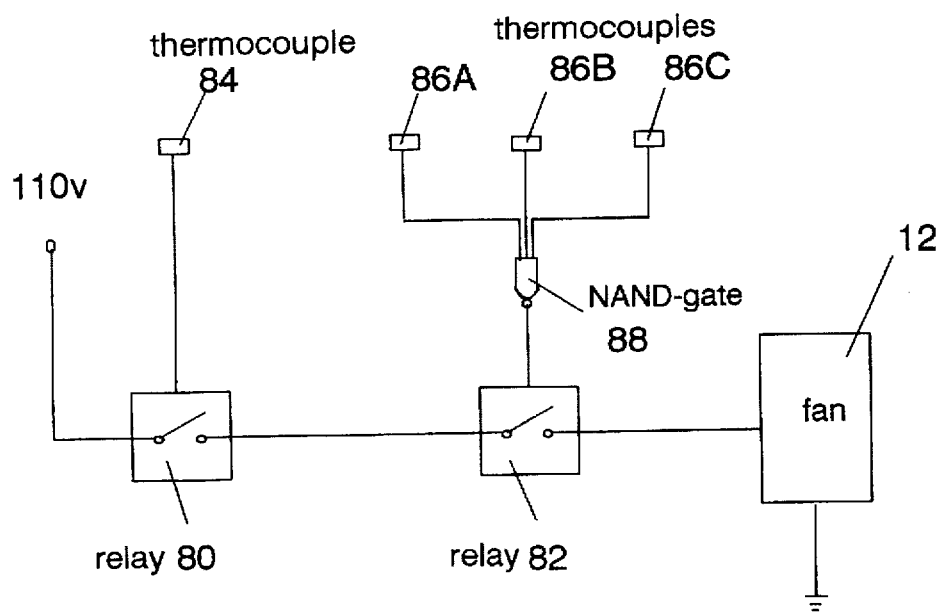
FIG. 8 illustrates conceptually the control circuitry of the portable air-conditioning unit.

Referring to FIG. 8, the on-and-off of the fan 12 is controlled by two relays 80 and 82. The relay 80 is controlled by a thermocouple 84, which is mounted outside the surface of the housing 20 at the air-intaking port to measure the intaking air temperature. When the room air temperature is higher than a predetermined temperature, for example, 32° C., the relay 80 will be closed. Otherwise the relay 80 should be open. The relay 82 is controlled by a NAND gate 88 which is controlled by the signals from three thermocouples 86A, 86B and 86C. The thermocouples 86A, 86B and 86C are mounted on the housing interior surface and are evenly distributed in the region where the coolant carriers are loaded. If the temperature measured from any of the three measuring locations is lower than a predetermined point, for example, 29° C., the NAND-gate will keep the relay 82 closed. When the average room air-temperature is higher than the requirement and most part of the coolant 28 has the cooling ability, both the relays 80 and 82 will closed. As a result, the fan 12 will be on and the portable air-conditioning unit will function.

In addition to the preferred embodiment of this invention, some members of the portable air-conditioning unit can also be arranged in another fashion as follows. The fan 12 is fixed at the air-discharging end inside the housing 20. The coolant carriers 16 are loaded in the housing 20 in front of the air-inlet of the fan 12 so that the air is sucked through the coolant carriers 16 instead of being blown through. The perforated air-distributor 14 is not needed in this arrangement. The other members of the portable air-conditioning unit 100 remain the same as in the preferred embodiment.

In addition to water used as the coolant 28 in the preferred embodiment, the solution of water and inorganic salt, for example, potassium nitrate ($KNO_3$), can also be used as the coolant 28. The solubility of potassium nitrate ($KNO_3$) decreases from 45.3 g to 10.9 g per 100 g of water when temperature decreases from 30° C. to -2.9° C. so that a considerably large amount of potassium nitrate is crystallized before the solution solidifies. When the coolant carriers 16 are loaded in the housing 20, in addition to sensible heat and heat of fusion, the coolant 28 also absorbs a large amount of heat of solution.

A WORKING EXAMPLE

The example demonstrated in this section has a household freezer with working temperature not higher than -18° C., a 35 watts propeller fan, three to five pieces of coolant carriers, each of which having an out-to-out dimension 250 mm×250 mm×50 mm and a volume of content 2.25 $dm^3$ (liter). The coolant used in this example is water/ice. The total capacity for three, four and five pieces of the coolant carriers is 7.75 $dm^3$, 9.0 $dm^3$ and 11.25 $dm^3$, respectively. A room to be conditioned has a dimension of 4.8 m×3.3 m×2.4 m, a single glazing, lightly curtained 1.5 m×1.8 m window facing south, a south wall and a roof exposing to external surroundings, and other enclosing structures adjacent to well-ventilated but not air-conditioned adjacent zones. The roof has thermal conductivity of 1.163 $W/m^{2\circ}$ C., solar absorbtivity of 0.75, temperature wave specific damping of 11. The south wall has thermal conductivity of 1.52 $W/m^{2\circ}$ C., solar absorbtivity of 0.75, temperature wave specific damping of 13.5, delaying time of 8 hours. Thermal conductivity of other internal partitioning walls and the floor is about 1.27 $W/m^{2\circ}$ C.

During the night of a hot, humid and sunny day, with air-conditioning out-door design temperature of 36° C. and four pieces of coolant carriers containing ice freshly frozen by a freezer with working temperature -18° C., the portable-air-conditioning unit can cool the room from average temperature of 36° C. to 32° C. in about 15 minutes at bed-time, for example, 11:00 p.m., and maintain the average room temperature lower than 32° C. for about eight hours. With the same conditions, the portable-air-conditioning unit can maintain the average room temperature lower than 32° C. for about five to six hours from noon to evening in a sunny day. The supplying air temperature is about 26° C. In a cross-section of the supplying air flow two meters from the air supplying port, the average air temperature is about 27.5° C. The area of this cross-section is about 5 $m^2$. Staying in the area people will be surrounded by the air with average temperature of 27.5° C. In this working example, the total cooling energy that the portable air-conditioning unit supplies is about 4700 kJ without recharging the coolant carriers. The total cooling effect varies from 700 to 0 watts with the melting course of the ice. Once the room is cooled to the required temperature, the fan is not switched on by the thermostat until the room temperature rises beyond the required temperature. More or less coolant carriers can be used to extend or shorten the working time of the portable-air-conditioning unit. Changing the number of coolant carriers can also adjust the supplying air temperature. 32° C. of average room temperature is an acceptable temperature for sleeping and daily home activities. Unlike centralized air-conditioning systems mostly used in commercial buildings, the portable-air-conditioning unit in the present invention does not aim at offering thermal comfort for people wearing formal business suits. It aims at offering fairly comfortable conditions for daily residential uses in a much more economical, convenient and substantially noise free approach.

Although the description above contains many specificities, these should not be construed as limiting the scope the invention but as merely providing illustrations of some of the presently preferred embodiments of this invention. Changes and modifications may be made within this invention as will be obvious to persons with ordinary skill. Such changes and modifications and substitutions of equivalents are within the scope and teaching of this invention as defined in the claims as appended hereto.

What is claimed is:

1. An air-conditioning system with a portable air-conditioning means for cooling and dehumidifying a zone comprising:
   (a) a refrigerating means for providing cold source for said air-conditioning system,
   (b) a portable air-conditioning unit, which is physically separated from said refrigerating unit, further comprising:

a housing for said portable air-conditioning unit of said air-conditioning system, coolant absorbing heat from the air of said zone and releasing heat to said refrigerating unit, one or a plurality of coolant carriers containing said coolant and being placed in said housing when working as a heat exchanger to absorb heat from the air of said zone and being placed in said refrigerating unit for releasing heat to said refrigerating means, an air-moving means located in said housing for forcing the air of said zone into said housing and for forcing the air passing through the surface of said coolant carriers and also for forcing the air out to said zone from said housing, (c) a portable air-conditioning means cooling said zone by forcing the air passing through said coolant carriers which are filled with said coolant and can be transported between said refrigerating means and said portable air-conditioning unit for said coolant to release heat to said refrigerating unit and to absorb heat from the air of said zone being cooled, (d) an adjusting means regulating the length of working time of said portable air-conditioning unit and the total cooling effect that said portable air-conditioning unit supplies by choosing the number of said coolant carriers loaded into said air-conditioning unit, (e) a coolant transportation means transporting said coolant between said portable air-conditioning unit and said refrigerating means by using one or a plurality of said coolant carriers.

2. The invention as defined in claim 1 wherein:

said housing is a duct-like container having predetermined dimensions and two open ends for air intaking and discharging, and housing said air-moving means at the air-intaking end of said housing, and behind the air-outlet side of said air-moving means, housing a perforated air distributor and a series of said coolant carriers by a plurality of grooves extruded from the interior surface of said housing.

3. The invention as defined in claim 1 wherein:

said housing is a duct-like container having predetermined dimensions and two open ends for air intaking and discharging, and housing said air-moving means at the air-discharging end of said housing, and in front of the air-inlet side of said air-moving means, housing a series of said coolant carriers by a plurality of grooves extruded from the interior surface of said housing.

4. The invention as defined in claim 1 wherein:

said housing is insulated to prevent undesirable heat exchange between said coolant carriers and its surroundings and to prevent undesirable moisture condensation on the outside body of said housing.

5. The invention as defined in claim 1 wherein:

said housing is supported pivotably by a stand in such a way that the longitudinal axis of said housing has an elevation angle with the air-discharging side of said housing higher and said elevation angle can be adjusted to discharge the air to a desired region.

6. The invention as defined in claim 1 wherein:

said housing has a handle attached to its body or move easily said portable air-conditioning unit to a place needed to be cooled.

7. The invention as defined in claim 1 wherein:

said housing has a lid which covers said housing during the normal operation of said portable air-conditioning unit and can be opened to expose the housing to add in and take out said coolant carriers.

8. The invention as defined in claim 1 wherein:

said refrigerating means is a household freezer.

9. The invention as defined in claim 1 wherein:

said coolant is ice which absorbs both sensible heat and heat of fusion when it is placed in said housing of said air-conditioning unit and releases both sensible heat and heat of fusion when it is placed in said refrigerating unit.

10. The invention as defined in claim 1 wherein:

said coolant is a solution of inorganic salt and water which crystallizes then solidifies when said coolant is placed in said refrigerating means to release sensible heat, heat of fusion and heat of solution and is melted and dissolved and absorbs sensible heat and heat of fusion and heat of solution when said coolant is placed in said housing of said air-conditioning unit.

11. The invention as defined in claim 1 wherein:

said coolant carriers are made of plastic material which will not be deformed or broken by a reasonable amount of weight and the volume change due to thermal or phase change.

12. The invention as defined in claim 1 wherein:

said coolant carriers have a heat-exchanger structure and are constructed by self-enclosed inter-connected hollow ribs and bars among which said coolant can flow freely.

13. The invention as defined in claim 1 wherein:

said housing has a hole at the bottom edge of the air-intaking end of said housing, providing an exit for discharging condensed water from said coolant carriers.

14. The invention as defined in claim 1 wherein:

said air-conditioning system further comprises a condensate pan to collect water condensed from the surface of said coolant carriers.

15. The invention as defined in claim 1 wherein:

said condensate pan is placed below the air-intaking end of said housing.

* * * * *